Nov. 17, 1970  L. J. GUILBAULT  3,541,043
METHOD OF DRY BLENDING AN AGGLOMERATED MATERIAL
WITH A POWDERED MATERIAL
Filed April 26, 1967
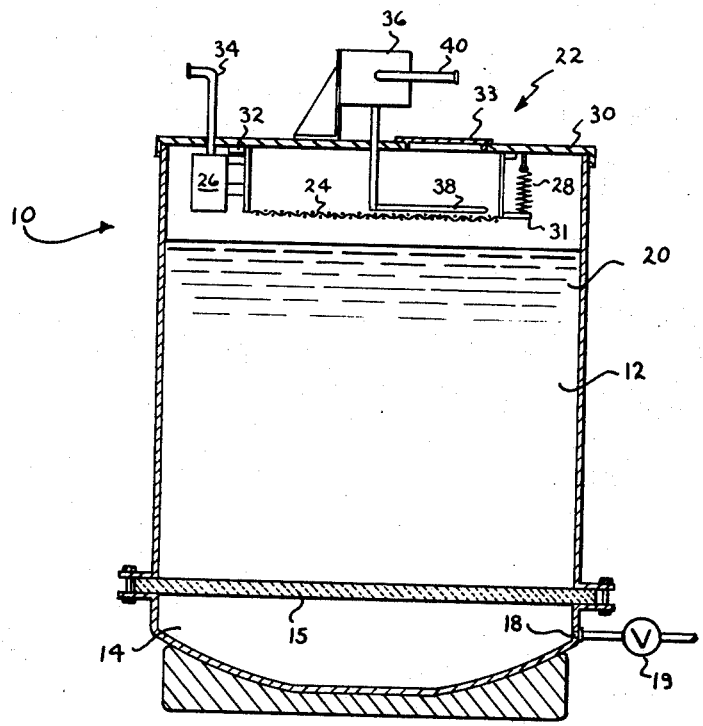
INVENTOR.
LAWRENCE J. GUILBAULT
BY
HIS ATTORNEY

United States Patent Office 3,541,043
Patented Nov. 17, 1970

3,541,043
METHOD OF DRY BLENDING AN AGGLOMERATED MATERIAL WITH A POWDERED MATERIAL
Lawrence J. Guilbault, Akron, Ohio, assignor to General Electric Company, a corporation of New York
Filed Apr. 26, 1967, Ser. No. 633,952
Int. Cl. B01f *13/02;* C08g *51/10*
U.S. Cl. 260—37                                        9 Claims

ABSTRACT OF THE DISCLOSURE

Finely divided, electrical insulating materials which tend to agglomerate, such as glass fibers, powdered pigments, fumed silica and the like, are added to a fluidizable powder, such as powdered thermosetting film-forming material, by sifting the agglomerated material into an active fluid bed of the fluidizable powder.

BACKGROUND OF THE INVENTION

This invention relates to a method of preparing coating compositions, and more particularly, to a method of preparing dry, coating compositions adapted for use in fluidized bed type coating processes.

While this invention is valuable for preparing any coating composition of the type referred to in which an agglomerated material is mixed with a fluidizable material, it is especially useful and valuable for preparing the coating compositions described and claimed in my copending patent application, Ser. No. 551,730, filed on May 20, 1966, now U.S. Patent 3,485,789, entitled Pulverulent Coating Compositions and Fluidized Bed Coating Method, which I assigned to the assignee of the present invention, and this invention will be more particularly described in that connection. My above-cited patent application is intended to be incorporated herein by reference.

The coating compositions described and claimed in my copending patent application have been found to perform in a highly satisfactory manner. Furthermore, the small fibers described therein can be satisfactorily dry blended with the powdered, thermosetting film-forming material referred to, thereby forming a homogeneous coating composition without destroying the integrity of the fibers, by conventional apparatus such as a ball mill, a V-shell blender, or a Cowles dissolver, also referred to in my copending patent application. It is well known in the art that the fibers of the type described in my copending patent application, having a diameter of about 0.0005 inch or less and an average length of about 0.01 to about 0.10 inch, tend to become agglomerated when they are stored alone in a mass, due, theoretically, to factors such as electrostatic charges on the fibers themselves. These fibers are illustrative of materials which are finely divided and have good electrical insulating characteristics and therefore have a greater tendency to agglomerate and resist being mixed with other materials. Heretofore, mechanical energy was added to a mixture of the fibers and the powdered material by way of the ball mill, the V-shell blender, or the Cowles dissolver or other suitable apparatus, to forcibly de-agglomerate the fibers and allow the powdered material to come between the forcibly separated individual fibers. After the mixture is dry blended in this manner for a suitable length of time, a sufficient amount of the powdered material has come between the individual fibers to provide a homogeneous mixture of the two. Thus, the homogeneous composition necessary for the desirable uniform coating of articles is formed, which uniform coating, for example, is necessary to insulate electrical coils of dynamoelectric machines and the like from extreme mechanical, electrical, chemical, and thermal stresses.

While satisfactory dry blending was attained by the conventional apparatus described above, this apparatus is expensive to purchase and install in sizes sufficient to supply batches of coating material for continuous coating processes. Furthermore, it has been found that the addition of mechanical energy sufficient to de-agglomerate the fibers raises the temperature of the mixtures to the fusing temperature of the coating composition, which temperature causes the composition to fuse and become unusable. Therefore, the temperature of the mixture being blended must be maintained below the fusing temperature, as by supplying a water jacket to cool the container, by passing a cooled gas through the mixture, or by stopping the blending process periodically to allow the mixture to cool. Any of these methods of controlling the temperature of the mixture during the blending process results in an increased cost of the resulting coating composition.

Furthermore, production experience using coating compositions of the type claimed in my copending patent application has shown that it is desirable to adjust the glass fiber content of the coating compositions to optimize the properties of the final coatings.

OBJECTS OF THE INVENTION

Therefore, it is an object of this invention to provide an improved less expensive method of preparing coating compositions for use in fluidized beds.

It is another object of this invention to provide a method of dry blending agglomerated material with a powdered fluidizable material without substantially raising the temperature of the resulting coating composition.

It is a further object of this invention to provide a method of raising the percentage of fiber content of a small-fiber containing coating composition used in a fluid bed coating process.

It is still a further object of this invention to provide a method of adding an agglomerated material to a fluidizable material to produce a homogeneous resulting composition without mechanically mixing the composition after the agglomerated material is added.

SUMMARY OF THE INVENTION

Unexpectedly, I have found that agglomerated materials such as the small fibers discussed above, can be dry blended with a fluidizable material to provide a homogeneous composition without the addition of mechanical energy after the materials are mixed together. The fluidizable material must be fluidized in an active fluid bed. Thereafter, the agglomerated material is sifted through a sieve, having openings of a size which pass the particles of the agglomerated material without passing the agglomerates themselves, and into the fluidized material where the particles are mixed with this material before they can become agglomerated once again.

The novel features believed characteristic of this invention are set forth with particularity in the appended claims. The invention itself, however, both as to its organization and method of operation, together with further objects and advantages thereof, may best be understood by reference to the following description taken in conjunction with the accompanying drawing, which schematically illustrates a sectional view of a simple form of apparatus being employed to dry blend an agglomerated material with a fluidized material.

DETAILED SPECIFICATION

During a series of experiments attempting to find new methods of measuring the fiber concentration of a dry blended, homogeneous coating composition of the type described and claimed in my afore-cited, copending patent application, I attempted to separate the fibers from the thermosetting, film-forming material by passing the coating composition through vibrated screens, the openings of the screens being slightly larger than the diameter of the fibers but smaller than the length of the fibers. It was found that the fibers passed through even the smallest screens used, apparently by standing on end as a result of the vibration.

When a mixture of the coating composition and the agglomerated fibers as well was placed in the screens, surprisingly and unexpectedly the agglomerated fibers passed through the vibrated screens as well. Obviously, the fibers had to de-agglomerate to pass through the fiber screens. However, when the collected screened mixture was examined, it was observed that the fibers were in an agglomerated state once again. When a few of the screened fibers were allowed to fall from the screen onto a surface without coming into contact with one another, these fibers were observed in a de-agglomerated state.

With this information, I theorized that if these screened or sifted, de-agglomerated fibers could be sufficiently intermixed with the powdered material discussed above, which powders allow them to form a homogeneous mixture with the powdered material after they have undergone dry blending processes using apparatus such as ball mills, Cowles dissolvers, or V-shell blenders and the like, a homogeneous composition might be formed without applying mechanical force to the mixture of de-agglomerated fibers and powdered material.

Surprisingly, I found that the powdered material is sufficiently intermixed with the de-agglomerated fibers before these fibers contact each other, by employing the fluidized bed process fully described in United States Patent No. 2,844,489 issued to Gemmer. The figure of the accompanying drawing illustrates a simple and basic form of apparatus suitable for this process. As shown, the apparatus includes an open-topped container 10 constructed of any suitable material. Container 10 is divided horizontally into an upper chamber 12 and a lower chamber 14 by a gas pervious partition 15.

The container 10 is provided with a gas inlet opening 18 which is adapted for connection through a shut-off valve 19 to a suitable source of gas under pressure (not shown) to pressurize the lower chamber 14. The upper chamber 12 is adapted to confine the fluidized material 20. Accordingly, partition 15 should be pervious to the gas used but impervious to the particles of coating material. Conveniently, the partition 15 takes the form of a porous ceramic plate having an average pore diameter in the range of from 0.003 to 0.004 inch or less.

To sift the agglomerated fibers into the fluidized powder in a de-agglomerated state, I employ a vibrating screen assembly 22, basically comprising a screen 24 and any means for vibrating the screen, such as an air-pressure actuated vibrator 26. The size of the openings of the screen must be large enough to pass the individual fibers into the fluidized powder, but small enough to prevent the agglomerated fibers from entering the powder. Experience in developing this invention has shown that whenever small amounts of the agglomerated fibers enter into the fluidized powder without first being de-agglomerated, entering the bed, for example, by being spilled over a side of the vibrating screen, a large percentage of these fibers will not be de-agglomerated by the action of the active fluid bed. Rather, these fibers remain agglomerated and in a subsequent coating process result in a harmful, non-uniform coating. However, when all the fibers added to the fluidized bed pass through a vibrated screen of the type described, the resulting composition is a homogeneous mixture of the fibers and the powder which results in a highly satisfactory, uniform coating when subsequently used to coat articles. Screen sizes ranging from 325 mesh with an opening of 0.0017 inch, to 20 mesh, with an opening of .0331 inch, have been used to pass de-agglomerated fibers having a diameter of about .0005 inch or less and a length of about .0312 inch without passing these fibers in an agglomerated form. A satisfactory screen size is a 40 mesh screen, having openings of about .0165 inch.

The screen itself should be vibratably mounted at the top of the container 10 so that the agglomerated fibers can be sifted into the active fluid bed. In the illustrated embodiment of this invention, the screen is supported by a number of springs, the one shown being marked with the numeral 28. The springs are attached to an impervious frame 30, which is itself supported by the sides of the container 10 and attached to a lower support member 31 for the spring assembly. The frame 30 and a gasket 32 between the sides of the screen member and the frame 30 prevent agglomerated fibers from falling into the fluid bed as they are vibrated. The agglomerated fibers are placed in the screen assembly through an opening 33 in the frame 30.

The vibrator 26 can be any convenient vibrating device, one of which is the Vibrolator vibrator, Model UCV–19, made by Martin-Engineering Co., Neponset, N. J. Air is fed from a source (not shown) and through a pipe 34 to the vibrator 26, which since it is fastened to the sides of the screen in a convenient manner, as by being bolted to it, vibrates the screen to cause it to sift its contents.

The screen can be vibrated at any frequency and amplitude which causes the agglomerated material to pass in de-agglomerated form through its openings and into the active fluid bed. By way of example, and without any intent of limitation, the agglomerated glass fibers discussed above were de-agglomerated when the amplitude of screen vibrations were in the range of about $\frac{1}{32}$ inch to $\frac{1}{16}$ inch, and the frequency of vibration was about 2,800 cycles per second. The agglomerated fibers can be stirred slowly to aid the flow of the individual fibers through the screen. In the illustrated embodiment of the apparatus, an air motor 36 drives a stirring device 38 near the surface of the screen 24 when air is supplied through a pipe 40 from an air source (not shown).

Therefore, in order to dry blend finely divided materials, such as glass fibers, which tend to agglomerate when individual particles of these materials come in contact with each other, into a homogeneous composition also contaning a powdered material, such as the film-forming material discussed above, the powdered material is first fluidized in an active fluid bed such as that retained in container 10. Then the agglomerated material is sifted through the vibrated screen assembly 22 and into the active fluid bed. The agglomerated material is de-agglomerated as it passes through the screen and mixes with the contents of the active fluid bed to provide a homogeneous resulting composition.

The insulating characteristics of coating compositions of the type described in my copending application, which were dry blended in accordance with this invention, are the same as those compositions which were dry blended by adding mechanical energy to the mixture of the fibers and the powdered materials. Furthermore, the coating compositions are dry blended without raising the temperature of the mixture of the fibers and the powder as blending takes place, eliminating the need for cooling the mixture as well as resulting expense and delays. This dry blending process itself is much faster than the prior methods used. As an added feature, the agglomerated fibers are de-agglomerated and dry blended with the powdered material without incurring the physical damage to the fibers which might be caused by a ball mill, a Cowless dissolver, or a V-shell blender.

I have found that my invention is particularly useful for raising or maintaining the percentage of fibers in a coating composition, to optimize the characteristics of the final coating. The screen assembly can be placed on the actual fluid bed used for coating, allowing the fiber content of the composition to be changed without removing the composition from the bed container.

This invention should not be confused with the normal sifting or screening process which prevents oversized particles from entering a fluid bed container. That is not the purpose of this invention. Rather, this invention provides a method of de-agglomerating a material which would not normally be de-agglomerated by the action of the fluid bed alone. The agglomerated material is de-agglomerated by sifting it through the vibrating screen and then it is mixed by the action of the active fluid bed before the material can become agglomerated again. However, the sifting or screening step of this invention can eliminate oversized particles as well.

This invention is not limited by the illustrated embodiment disclosed in the specification. I have found, for example, that other finely divided materials that tend to agglomerate, such as powdered pigments and fumed silica, can be homogeneously combined with fluidized coating compositions through the use of this invention. Therefore, it is intended that the following claims define the scope and breadth of this invention.

What I claim as new and desire to secure by Letters Patent of the United States is as follows:

1. The method of preparing a dry, fluidizable mixture which includes a finely divided, electrical insulating material which tends to become agglomerated and a second substance including a powdered material which allows a homogeneous composition to be formed when they are sufficiently blended comprising the steps of:
   (a) providing an active fluid bed of said second substance; and
   (b) sifting said agglomerated material directly into said active fluid bed so that said agglomerated material enters said active fluid bed in a de-agglomerated form and is homogeneously combined with the powdered material by the action of the active fluid bed before it can reagglomerate.

2. The method of claim 1 wherein said agglomerated material comprises a fibrous material.

3. The method of claim 1 wherein said agglomerated material is sifted through a vibrating screen.

4. The method of claim 1 wherein said agglomerated material comprises fibers having a diameter of about 0.0005 inch or less and an average length between about 0.01 and 0.10 inch, and said powdered material comprises a film forming material having a granular size between about 0.001 and about 0.024 inch.

5. The method of preparing a dry, fluidizable mixture suitable for use in a fluidized bed type coating process, comprising the steps of:
   (a) providing a film forming material having a granular size between about 0.001 and about 0.024 inch;
   (b) providing fibers having a diameter of about 0.0005 inch or less and an average length between about 0.01 and about 0.10 inch;
   (c) providing an active fluid bed of from about 60 to 95 weight percent of said film forming material in an active fluid bed; and
   (d) sifting from about 5 to 40 weight percent of said fibers through a vibrating screen of a size which prevents agglomerated fibers from passing through it, said fibers falling in a de-agglomerated state directly into said active fluid bed so that a homogeneous composition of said film forming material and said fibers is formed by the action of the active fluid bed before the fibers can reagglomerate.

6. The method of preparing a dry, fluidizable mixture which includes a first material which is fluidizable in an active fluid bed and a second material which is a finely divided, electrical insulating material, comprising the steps of:
   (a) providing an active fluid bed of a known quantity of said first material; and
   (b) sifting a preselected quantity of said second material directly into said active fluid bed of said first material so that the action of said active fluid bed effects a homogeneous mixture of said first material and said second material.

7. The method of claim 6 wherein said second material is an agglomerated material.

8. The method of claim 7, wherein said agglomerated material comprises glass fibers.

9. The method of claim 7, wherein said agglomerated material comprises fibers having a diameter of about 0.0005 inch or less and an average length between about 0.01 and 0.10 inch, and said first material includes a powdered material comprising a film forming material having a granular size between about 0.001 and about 0.024 inch.

References Cited

UNITED STATES PATENTS

| 2,844,489 | 7/1958 | Gemmer | 117—20 |
| 2,718,471 | 9/1955 | Samler | 106—181 |

OTHER REFERENCES

Leva, "Fluidization" (McGraw-Hill), (N.Y.), (1959), pp. 272–273.

Chemical Processing, 24, 132–134 (September 1961).

MORRIS LIEBMAN, Primary Examiner

H. H. FLETCHER, Assistant Examiner

U.S. Cl. X.R.

117—27, 100; 252—381, 384, 385; 259—18, 147